UNITED STATES PATENT OFFICE.

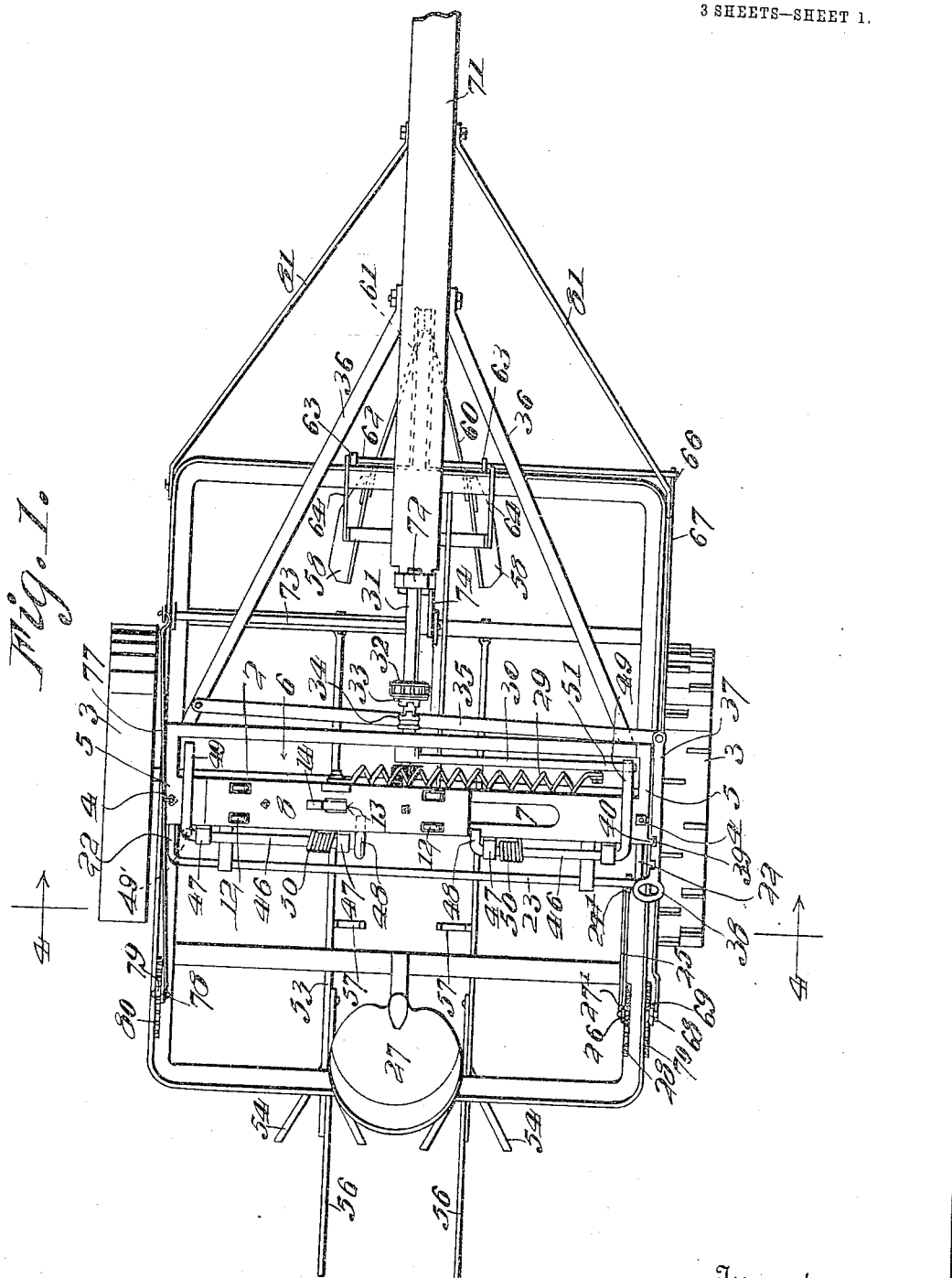

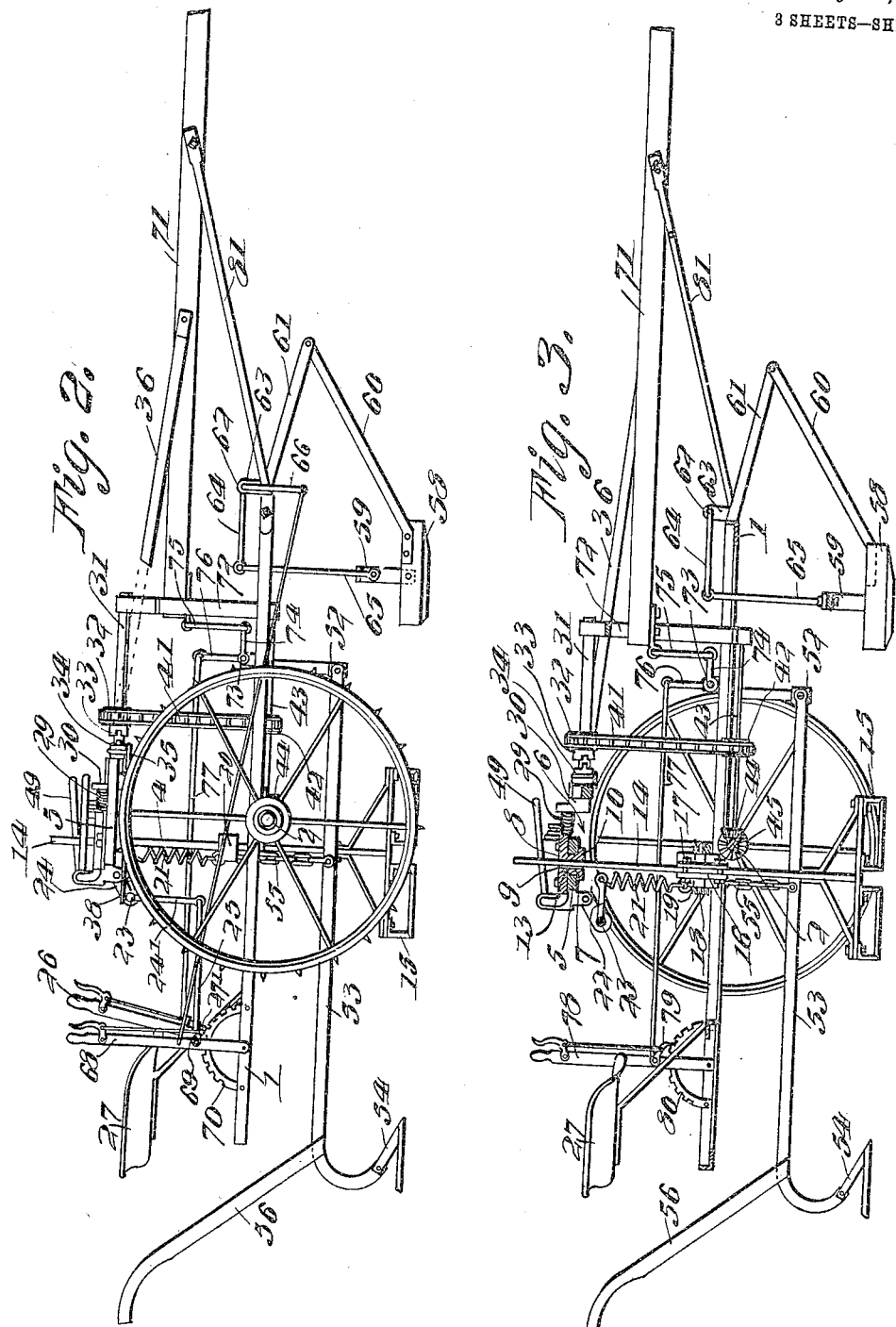

ROBERT B. MORRIS AND WILLIAM KENNEDY, OF HARRISONVILLE, MISSOURI, ASSIGNORS OF ONE-THIRD TO FRANK H. HOWARD, OF HARRISONVILLE, MISSOURI.

COTTON AND BEET CHOPPER AND CULTIVATOR.

958,153.      Specification of Letters Patent.      Patented May 17, 1910.

Application filed March 18, 1909. Serial No. 484,209.

*To all whom it may concern:*

Be it known that we, ROBERT B. MORRIS and WILLIAM KENNEDY, citizens of the United States, residing at Harrisonville, in the county of Cass and State of Missouri, have invented certain new and useful Improvements in Cotton and Beet Choppers and Cultivators; and we do declare the following to be a full, clear, and exact description of the invention, such as will enable others skilled in the art to which it appertains to make and use the same.

This invention relates to improvements in cotton and beet choppers and cultivators.

The object of the invention is to provide a machine of this character having an improved construction of chopping mechanism and means whereby the plants are weeded and cultivated simultaneously with the chopping operation.

With the foregoing and other objects in view, the invention consists of certain novel features of construction, combination and arrangement of parts as will be more fully described and particularly pointed out in the appended claims.

Figure 4:
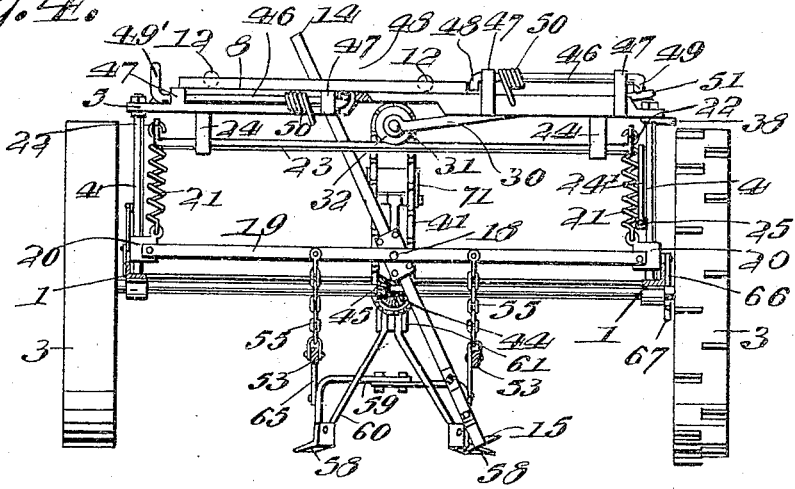
Figure 5:
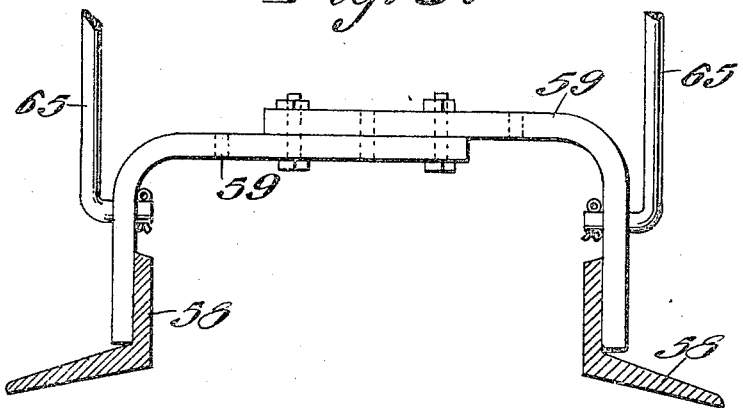

In the accompanying drawings, Figure 1 is a top plan view of a cotton chopping, weeding and cultivating machine constructed in accordance with our invention; Fig. 2 is a side view of the same; Fig. 3 is a vertical longitudinal sectional view; Fig. 4 is a vertical cross sectional view on the line 4—4 of Fig. 1; Fig. 5 is a detail cross sectional view of the weeder blades and supporting and adjusting mechanism.

Referring more particularly to the drawings, 1 denotes the main frame of the machine which is provided with suitable bearings in which is revolubly mounted a supporting and driving shaft 2, on the outer ends of which are fixed supporting and driving wheels 3. On the main frame 1 are secured supporting standards 4, on the upper ends of which is mounted a shuttle carrying frame 5 in which is formed a transversely disposed opening 6 and a similarly disposed shuttle receiving opening 7, in which is mounted to reciprocate the shuttle 8, said shuttle comprising an upper plate on the underside of which is formed a rib 9 which slidably engages the slot or opening 7 in the frame 5 and on the underside of said rib is secured a retaining plate 10 by means of which the shuttle is held in sliding engagement with the frame 5. In the upper plate of the shuttle adjacent each end are operatively mounted pairs of supporting rollers 12 which engage the top of the frame 5 and thus permit the shuttle to slide freely thereon. In the shuttle, mid-way between its ends, is formed a slot 13 to receive the upper end of an arm or lever 14 of the chopping hoe 15.

The lever 14 of the chopping hoe 15 is adjustably clamped between supporting plates 16 by means of clamping bolts 17 and on the plates 16 are formed trunnions 18 which are pivotally engaged with hoe supporting bars 19, the outer ends of which are secured to brackets 20 which in turn are slidably mounted on the standards 4. The brackets 20 are yieldingly and adjustably supported on the standards 4 by short coiled springs 21, the upper ends of which are connected to the cranked outer ends 22 of a rock shaft 23 mounted in brackets 24, on the underside of the shuttle supporting frame 5. On the rock shaft 23 is formed a crank arm 24' which is connected by an operating rod 25 to a hand lever 26 arranged on one side of the frame adjacent to the driver's seat 27. The lever 26 is provided with a retaining pawl 27' which co-acts with the toothed rack 28 to hold the lever and the hoe supporting bars in their adjusted position.

Connected to the shuttle is a suitable operating mechanism comprising a coil spring 29, one end of which is secured to the shuttle midway between its ends, while the opposite end is secured to a wrist pin on a crank arm 30 which is fixedly mounted on an operating shaft 31 journaled in suitable bearings on the frame of the machine. Loosely mounted on the shaft 31 is a sprocket gear 32 having formed thereon one member of a clutch 33, the opposite member 34 of which is slidably keyed to the shaft 31 and is adapted to be shifted into engagement with the clutch member 33 on the sprocket gear 32 by means of a shifting lever 35 which is pivotally mounted on a forward extension 36 of the frame 5 and is provided with an operating rod 37 extending rearwardly along one side of the frame 5 and having on its rear end a handle 38 which is arranged within reach of the driver. The rod 37 is provided with a plurality of locking notches 39 which are adapted to be engaged with a locking lug 40 on one end of the frame 5 thereby holding the lever 35 and the clutch member 34 into and out of engagement with the sprocket wheel 32. When the clutch member 34 is engaged with the clutch member 33 of the sprocket wheel, the latter will be operatively connected to the shaft 31 and will drive said shaft through a sprocket chain 41 which is engaged with a sprocket wheel 42 on a power transmitting shaft 43 journaled in suitable bearings on the frame 1 of the machine and having on its rear end a bevel gear pinion 44 which is engaged with a bevel gear 45 mounted on the supporting axle or shaft 2 of the machine. By means of the gears and power transmitting shaft just described, the movement of the drive shaft or axle will be imparted to the crank arm 30 which is operatively connected to the shuttle 8 by means of the spring 29, as hereinbefore described.

In order that the pressure of the spring 29 may be exerted to provide a quick jerking movement to the shuttle chopping hoe, we provide a suitable shuttle stopping and holding mechanism comprising rock shafts 46 which are operatively mounted in suitable bearings 47 on the rear side of the frame 5, as shown. The rock shafts 46 are provided on their inner ends with inwardly projecting stop lugs 48 and on their outer ends with forwardly projecting trip arms 49. The shafts 46 are provided with coil springs 50. The spring on the shaft 46 at the right hand side of the machine frame exerts its tension to hold the stop lug 48 of said shaft down against the frame 5 and in the path of movement of the shuttle, while the spring on the opposite shaft 48 tends to normally hold the stop lug of said shaft up in the path of movement of the shuttle, whereby when the shuttle is moved from one side of the frame to the other, first one and then the other of the stop lugs 48 will engage opposite ends of the shuttle and momentarily hold the same at opposite ends of the frame 5. The shuttle-carrying frame is suitably recessed to permit the stop lug of the shaft 48 at the left hand side of the machine to rise into the path of movement of the shuttle.

The lugs 48 are disengaged from the shuttle by means of a trip finger 51 formed by the outer end of the crank arm 30, said finger being adapted to engage and lift the trip arms 49 as the arm 30 moves past the same, thereby turning the rock shaft 46 and disengaging the stop lugs 48 from the end of the shuttle, thus permitting the spring 29, which at this time is stretched by the crank arm 30, to jerk the shuttle over to the opposite end of the frame 5, in which position it will be momentarily held by the stop lug 48 at the opposite end of the frame, said stop lug being released by the finger 51 when the crank arm turns to the opposite side of the frame, and the finger 51 comes into engagement with the trip arm at that end of the frame. By this means, it will be seen that the shuttle is jerked back and forth across the frame 5 by the spring 29 and that it is held momentarily by the stop lugs to permit the crank arm 30 to stretch the spring 29 to the desired tension. The trip arm 49 at the left hand side of the frame is normally held above the shuttle carrying frame 5 by the vertical extension 49' at the outer end of its rock shaft, so that when said trip arm is engaged by the crank arm 30, it is permitted to swing downwardly and inwardly in an arc toward the shuttle carrying frame sufficiently to allow the crank arm to pass.

Pivotally connected at their forward ends to the hangers 52 on the supporting frame of the machine, are cultivator beams 53 on the rear downwardly curved ends of which are secured cultivator shovels 54. The cultivator beams are adjustably supported near their rear ends by short chains 55, the upper ends of which are connected to the hoe supporting bars 19 whereby when said bars are raised by means of the rock shaft 23 and operating lever connected therewith, said cultivators will also be raised out of engagement with the ground. The cultivator beams 53 are provided with handles 56 by means of which the cultivators may be directed by an operator walking in rear of the machine and the beams are also provided with foot rests 57 which are engaged by the feet of the driver on the seat 27, thus providing for the guiding or directing of the cultivator when the operator is riding.

The weeding mechanism employed in connection with the machine comprises a pair of weeding blades 58 which are secured to the lower ends of a substantially bail-shaped supporting frame 59, said frame being formed in adjustably connected sections, as clearly shown in Fig. 5 of the drawings, whereby the blades may be arranged at various distances apart. The weeding blades are operatively connected with the machine by means of draft rods 60 which are connected to the forward ends of the blades and at their forward ends are connected to a draft arm 61 formed on the extension of the frame 1.

The weeding blades are adapted to be raised and lowered into and out of engagement with the ground by means of an elevating mechanism comprising a rock shaft 62 revolubly mounted in suitable bearing brackets 63 on the frame of the machine. The rock shaft 62 has rearwardly projecting crank arms 64 which are connected at their rear ends with the supporting frame 59 by hanger rods 65. On one end of the rock shaft 62 is formed a crank arm 66 which is connected by an operating rod 67 to a hand lever 68 mounted on the frame within convenient reach of the driver whereby the rock shaft 62 may be operated to raise or lower the weeding blades, as will be understood. The hand lever 68 is provided with a locking pawl 69 which is engaged with a segmental rack 70 whereby the rock shaft is held in its adjusted positions to support the weeding blades.

The forward end of the machine is preferably adjustably connected to the rear end of the draft tongue 71 and in order to thus connect the tongue with the machine, the rear end of the tongue is slidably engaged with the vertically disposed guide frame 72 and on the forward end of the machine is operatively mounted a rock shaft 73, on one end of which is fixedly mounted a crank arm 74 which is connected by a link 75 to the rear end of the tongue. On the opposite end of the rock shaft 73 is fixed a crank arm 76 which is connected by an operating rod 77 to a hand lever 78 arranged on the frame within reach of the driver's seat, whereby the rock shaft may be operated to raise and lower the forward end of the machine. The lever 78 is provided with a pawl 79 which co-acts with a segmental rack 80 to hold the lever in its adjusted position. The tongue 71 is loosely connected to the forward end of the machine by draft rods 81.

By means of a machine constructed as herein shown and described, the operation of weeding, chopping out or thinning the plants and cultivating the same may be simultaneously carried on as the machine is drawn back and forth across the field and by means of the adjusting mechanism, the chopping hoe, cultivators and weeders may be adjusted to operate at various depths or may be entirely disengaged from the ground. It will be noted that the chopping hoe 15 is of double construction, thus more rapidly thinning out the plants.

While the machine is herein shown and described as being drawn by horse power, it is obvious that the same may be propelled by a suitably arranged motor and operating connections, not shown.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of the invention as defined in the appended claims.

Having thus described our invention, what we claim as new is:

1. In a machine of the character described, a wheeled supporting frame, a chopping hoe yieldingly and adjustably supported in said frame, and a spring actuated shuttle adapted to operate said hoe.

2. In a machine of the character described, a wheeled supporting frame, a chopping hoe operatively mounted in said frame, a hoe operating shuttle, a spring to actuate said shuttle, means to stretch said shuttle actuating spring, holding devices to momentarily hold the shuttle against the pull of the spring while the latter is being stretched, and means to automatically release said holding devices.

3. In a machine of the character described, a wheeled supporting frame, a chopping hoe, means whereby said hoe is pivotally and adjustably supported in said frame, a shuttle supporting frame, a hoe operating shuttle slidably mounted in said frame, a shuttle operating mechanism including a spring adapted to jerk the shuttle back and forth, and means to momentarily hold the shuttle at the end of its strokes, while the spring is being stretched.

4. In a machine of the character described, a wheeled supporting frame, a chopping hoe operatively mounted in said frame, a shuttle supporting frame, a hoe operating shuttle slidably mounted in said frame, a shuttle operating mechanism including a spring adapted to jerk the shuttle back and forth, a drive shaft, a shuttle operating shaft connected to said drive shaft, and means on said shuttle operating shaft to stretch said spring and thereby cause the latter to operate said shuttle.

5. In a machine of the character described, a wheeled supporting frame, a shuttle supporting frame, hoe supporting bars adjustably connected to said shuttle supporting frame, means to yieldingly hold said hoe supporting frame in its adjusted positions, a chopping hoe pivotally and adjustably mounted in said hoe supporting bars, a shuttle slidably mounted in said shuttle frame and adapted to engage said hoe, and a shuttle operating mechanism including a spring whereby said shuttle is jerked back and forth to operate the hoe.

6. In a machine of the character described, a wheeled supporting frame, a chopping hoe operatively mounted in said frame, a shuttle supporting frame, a hoe operating shuttle slidably mounted in said shuttle frame, a drive shaft, a shuttle operating shaft connected to said drive shaft, a crank arm on said operating shaft, a coiled spring to connect said crank arm with said shuttle whereby the latter is jerked back and forth in said shuttle supporting frame, spring operated shuttle holding shafts, shuttle engaging stops on the ends of said shafts to momentarily hold the shuttle at the end of its strokes while said coiled spring is being stretched, and trip arms on the opposite ends of said shafts adapted to be engaged by the crank arm on the shuttle operating shaft, whereby said stops are disengaged from the shuttle to permit the spring to operate the same.

7. In a machine of the character described, a main supporting frame, a shuttle supporting frame arranged on said main supporting frame, a shuttle slidably mounted in said frame a vertically adjustable hoe supporting frame, hoe clamping plates pivotally mounted in said frame, a double bladed hoe adjustably secured to said clamping plates and having at its upper end an operating engagement with said shuttle, whereby when the latter is reciprocated, the hoe will be operated, a raising and lowering mechanism connected to said hoe supporting frame, said mechanism comprising a rock shaft, crank arms arranged on the opposite ends of said shafts, spring to connect said crank arms with said hoe supporting frame, an operating lever, and a connecting rod to connect said operating lever with said rock shaft whereby the latter may be turned to raise and lower the hoe supporting frame.

In testimony whereof we have hereunto set our hands in presence of two subscribing witnesses.

ROBERT B. MORRIS.
WILLIAM KENNEDY.

Witnesses:
  GEORGE C. EGY,
  F. H. HOWARD.